UNITED STATES PATENT OFFICE.

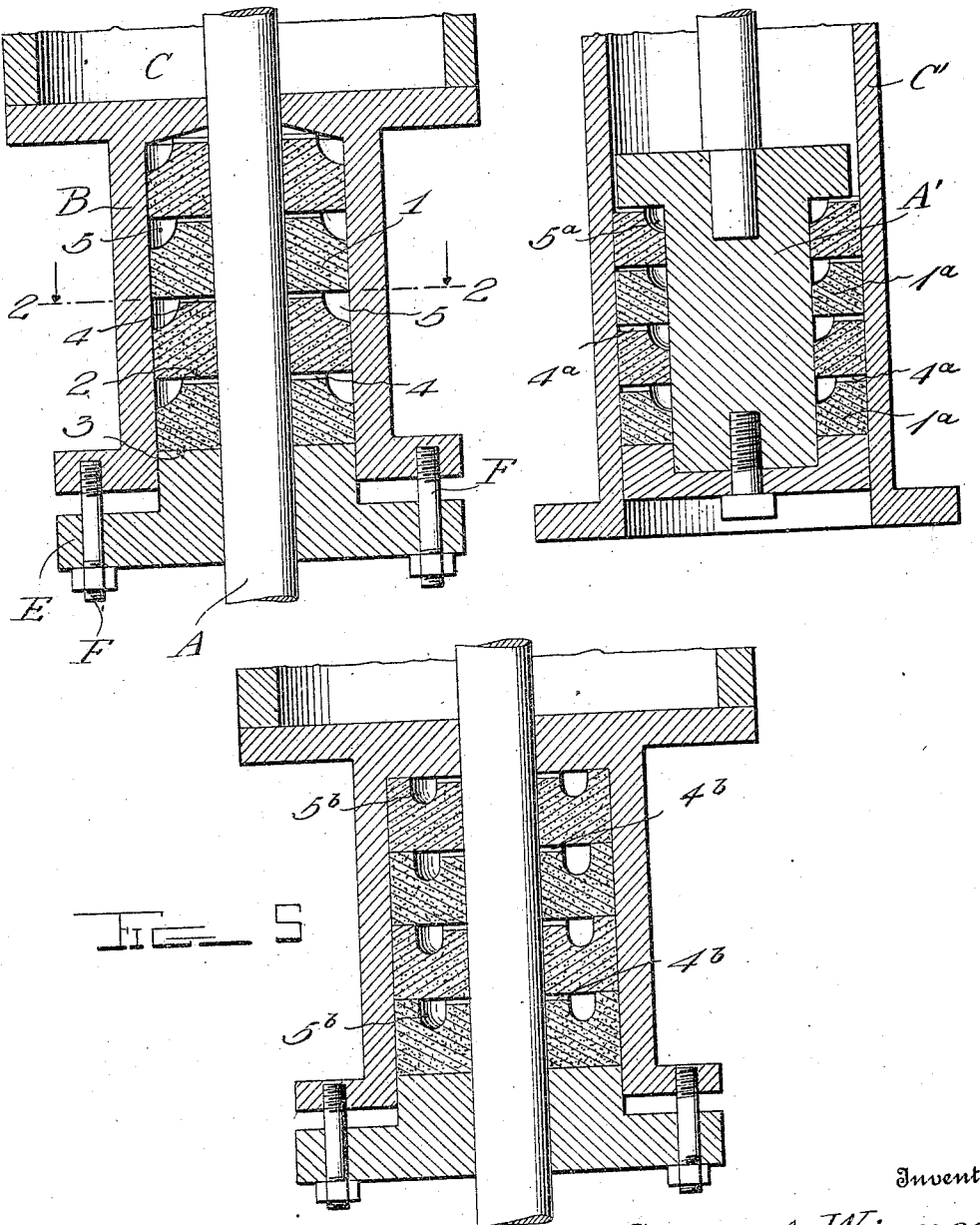

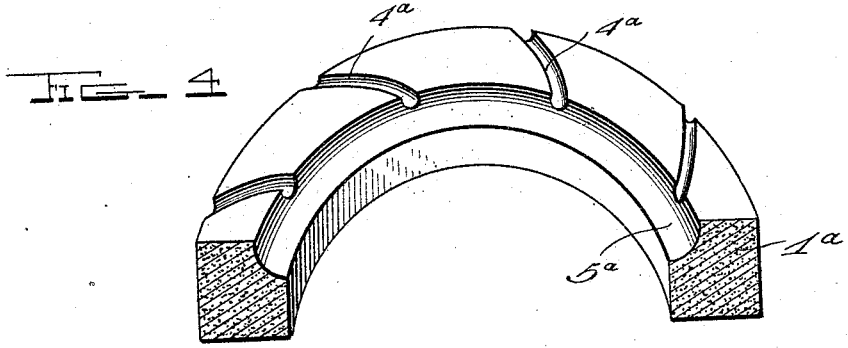
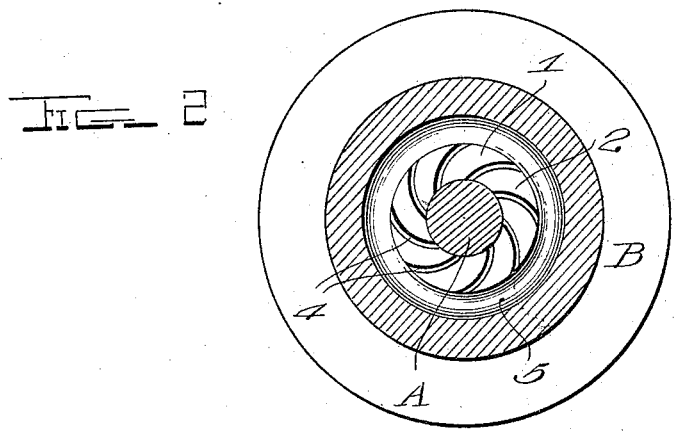
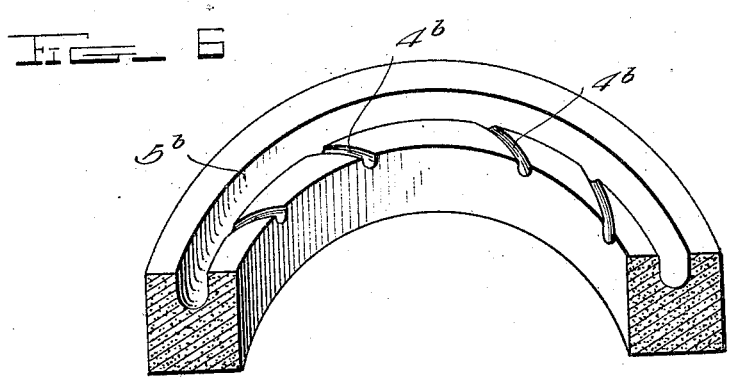

GEORGE A. WISMER, OF NEW YORK, N. Y.

AUTOMATIC PACKING.

1,052,705. Specification of Letters Patent. Patented Feb. 11, 1913.

Application filed July 9, 1912. Serial No. 708,527.

*To all whom it may concern:*

Be it known that I, GEORGE A. WISMER, a citizen of the United States, residing at New York, in the county of New York and State of New York, have invented certain new and useful Improvements in Automatic Packing; and I do declare the following to be a full, clear, and exact description of the invention, such as will enable others skilled in the art to which it appertains to make and use the same.

This invention relates to an automatic packing for piston rods, rams, cylinders and the like; and more especially those used in handling and pumping liquids or fluids of any kind regardless of the pressure thereof.

The object of the invention is to produce an effective packing which will automatically adjust itself with varying tension against the rod, plunger or cylinder to which it is applied.

With this and other objects in view, the invention consists of certain novel features of construction, and the combination and arrangement of parts as will be more fully described and claimed.

In the accompanying drawings: Figure 1 represents a longitudinal central section of a stuffing box equipped with one form of this improved packing; Fig. 2 is a horizontal section taken on the line 2—2 of Fig. 1; Fig. 3 is a longitudinal central section of another form of the invention showing it applied; Fig. 4 is a detail cross sectional view of the packing shown in Fig. 3; Fig. 5 is a longitudinal sectional view of still another form of the invention applied; Fig. 6 is a detail cross sectional perspective view of the packing shown in Fig. 5.

In the embodiment illustrated in Figs. 1 and 2 a packing ring 1 is shown constructed for use in connection with piston rods or the like where the wear takes place on the inside of the ring against the moving rod or plunger A. This ring 1 is composed of any suitable material, preferably of cotton duck, rubber, asbestos, a combination of such materials, or of a flexible metal. When necessary for excessive pressures or to prolong the life of the packing, it is composed of fibrous material combined with metal.

In Fig. 1, a plurality of the rings 1—four being shown—are arranged in a stuffing box B on one end of a cylinder C and surrounding a piston rod A. These rings 1 are securely held in the stuffing box B by the usual gland E secured by bolts F. Each of these rings 1 is provided with the usual opposite flat faces 2 and 3, and in one of these faces is formed a plurality of arcuate channels 4 extending from its inner edge to its periphery in order that the partitions between said channels may be gradually increased in thickness from the edge remote to a reservoir hereinafter described and forming one wall thereof. These channels are here shown curved, and merge at their outer ends in a recess 5 formed on the periphery of the ring adjacent the face 2 having the channels therein, and which when the ring is applied, forms a fluid reservoir connected by the channels 4 with the inner or piston engaging face whereby any fluid which enters the stuffing box around the rod A is conducted to the reservoir or reservoirs 5, according to the number of rings employed. This reservoir being constantly under more or less pressure, depending upon the pressure carried in the cylinder C and the amount of leakage, increases or releases the tension automatically of the packing ring 1 against the rod or plunger A. This automatic packing allows the rod which it surrounds to work freely without unnecessary friction when the machine to which the packing is applied is operated under low pressure. When pressure is increased the channels 4 serve as free passages to the reservoir 5 and the pressure in said reservoir is correspondingly increased, which causes an additional tension of the ring 1 on the rod A. When the operating pressure is reduced or changed the pressure in reservoir 5 is correspondingly reduced or changed, which automatically reduces or changes the tension upon packing ring 1 against rod A.

It will thus be obvious that the packing is automatic, exerting only sufficient tension to prevent leakage at existing pressures and that the tension is constantly varying according to the operating pressures, which serves to reduce friction to a minimum.

In Figs. 3 and 4 the rings 1ª are shown placed around a piston A¹ where the wear occurs on the outside of the rings or against the walls of the cylinder C¹. In this form of packings the principle involved is the same, the only difference being that the reservoir 5ª is arranged at the inner instead of the outer face of the ring 1ª and the curved channels 4ᵃ extend from the reservoir 5ᵃ to the periphery of the ring 1ᵃ which works against the wall of the cylinder C¹, the packing rings being carried by the piston A¹.

In Figs. 5 and 6 still another form of packing is shown which is applied to a rod where the wear takes place on the inside of the ring, the canals or channels 4ᵇ extending from the inner face to a reservoir 5ᵇ located midway the width of the ring between its wearing surface and its outer edge.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

I claim as my invention:

1. A packing having an annular recess remote from its wearing surface and having arcuate channels communicating with said recess, and partitions varying in width formed between said arcuate channels.

2. A packing having an annular recess remote from its wearing surface, said packing also having arcuate channels extending from the center thereof and communicating with said recess, and partitions between said channels increasing in width toward said annular recess.

In testimony whereof I have hereunto set my hand in presence of two subscribing witnesses.

GEORGE A. WISMER.

Witnesses:
 GEORGE W. ADAMS,
 W. O. COOBER.

---

Copies of this patent may be obtained for five cents each, by addressing the "Commissioner of Patents, Washington, D. C."